UNITED STATES PATENT OFFICE.

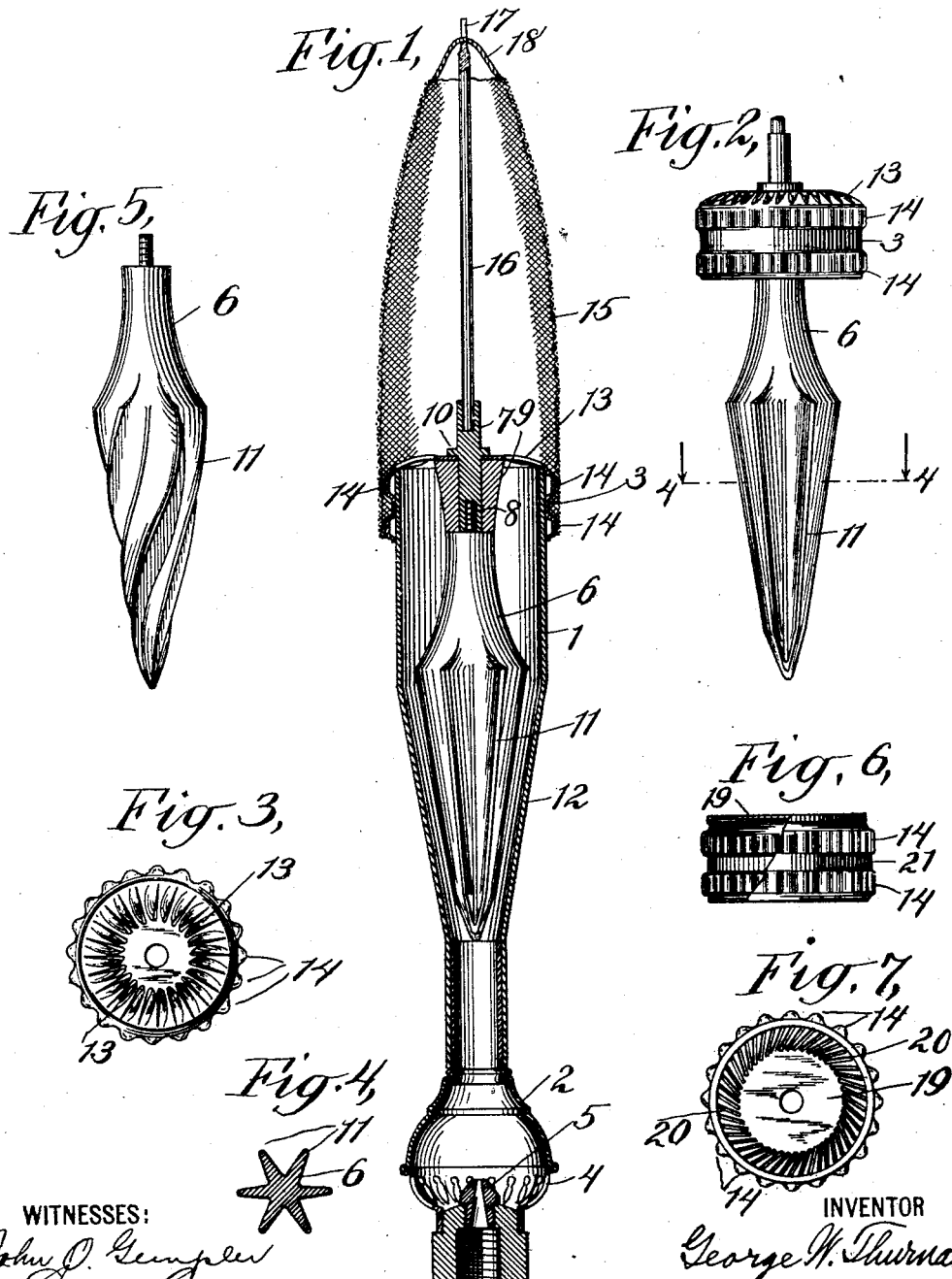

GEORGE W. THURNAU, OF NEW YORK, N. Y., ASSIGNOR TO AMERICAN INCANDESCENT LAMP COMPANY, A CORPORATION OF NEW JERSEY.

INCANDESCENT GAS-BURNER.

SPECIFICATION forming part of Letters Patent No. 710,540, dated October 7, 1902.

Application filed May 31, 1901. Serial No. 62,458. (No model.)

*To all whom it may concern:*

Be it known that I, GEORGE W. THURNAU, a citizen of the United States, and a resident of the city, county, and State of New York, have invented certain new and useful Improvements in Incandescent Gas-Burners, of which the following is a specification.

My invention relates to incandescent gas-burners, and it is directed more particularly to certain improvements in the devices for producing the flame by which the mantle of refractory material is heated.

The primary object of my invention is to provide a construction whereby the air and the gas are thoroughly mixed before they reach the point of combustion and whereby this is accomplished without materially decreasing the velocity of the flow.

Other objects of my invention are to provide a construction whereby the mixture of air and gas is heated to a suitable degree before it is delivered to the flame and also to provide a construction in which the tendency to back-fire is eliminated.

With these objects in view my invention consists in the novel parts, improvements, and combinations herein shown and described.

The accompanying drawings, which are referred to herein and form a part hereof, illustrate one embodiment of my invention, together with modifications of certain features, and serve, in connection with the description herein, to explain the principles of my invention and the best mode in which I have contemplated applying those principles.

Of the drawings, Figure 1 is a vertical central section of a burner constructed in accordance with my invention. Fig. 2 is a side elevation of certain parts of the burner. Fig. 3 is a plan view of the burner-tip shown in Figs. 1 and 2. Fig. 4 is a transverse section illustrating a detail, said section being taken on the line 4 4 of Fig. 2. Fig. 5 is a side elevation of a modified construction of one feature of the invention. Figs. 6 and 7 are a side elevation, partly in section, and a plan view, respectively, of a modified construction of another feature of the invention.

Like reference-numerals refer to like parts wherever they occur throughout the drawings.

In accordance with my invention an elongated mixing device is arranged in the tube or passage, in which the air and gas are mixed before they are delivered at the burner-tip. Preferably the mixing device is provided with longitudinal ribs and is tapered and pointed at one end and centrally arranged with its tapered portion within a corresponding flaring portion of the mixing-tube in alinement with the nozzle by which the gas is injected into the tube, so that the current of gas and air produced by the jet from the nozzle is penetrated at its center line and transformed into a hollow or tube-like stream or into a plurality of streams which in the aggregate have a hollow or tube-like formation, said stream or streams having the same general direction as that of the current injected into the tube and having throughout their length a gross sectional area which is as great as that of said current. In this way the central portion of the current or the portion thereof which is the richest in gas is broken up and directed outwardly into the adjoining portions of the current, which contain less gas, and this is accomplished without materially changing the direction of or obstructing the flow of the fluid, a very perfect mixture of the air and gas being thus effected without materially checking the velocity thereof. Preferably, also, the elongated mixing device is so connected with the burner-tip and is so constructed as to conduct a suitable portion of the heat from the burner-tip and impart it to the mixture, thereby materially increasing the speed of the mixture and materially raising the temperature of the flame.

Referring now in detail to the device shown on the drawings, numerals 1 and 2 represent the upper and lower parts of the mixing-tube, which parts are preferably detachably united at a point intermediate the length of the tube, the upper part being provided with a suitable burner-tip 3 and the lower part with suitable ports 4, through which the air is drawn into the tube by a jet of gas supplied by nozzle 5. A suitable form of the elongated mixing device is represented by the numeral 6. As shown, this device is tapered and pointed at its lower end and is so arranged in the mixing-tube that the pointed end is located at or near the center line of the current of air and gas entering the lower end of the tube. The mixing device is preferably supported in position by being connected to the tip 3. According to the construction shown the tip is perforated at its center, and a connecting-piece 7 passes through the perforation and is threaded onto a reduced portion or stem 8, forming the upper end of the mixing device 6, the parts being suitably spaced by a filling-piece 9, between the upper end of which and a shoulder 10 on the connection 7 the tip 3 is clamped. The filling-piece is preferably uniform in size with and practically forms a continuation of the upper end of the mixing device, which upper end is gradually reduced in section upwardly from the rib portion. By reason of this construction a portion of the heat generated by the flame at the tip is conducted through the mixing device down into the mixing-tube, where it is delivered to the incoming current of air and gas, and in order that the heating-surface may be brought into more intimate contact with all portions of the current of air and gas the mixing device 6 is preferably provided with a plurality of ribs 11, extending in the same direction and forming between them unobstructed passages for the air and gas, as shown. The ribs 11 are preferably integrally formed on the tapered portion of the mixing device and with it terminate at some distance below the top of the mixing-tube. It is preferred to have the mixing device located wholly below the burner-tip, as otherwise so much heat might be conducted into the mixing-chamber as to cause back-firing. With the construction as described the mixing device does not become hot enough to cause back-firing; but owing to the large heating-surface and its uniform distribution throughout the fluid the latter is uniformly heated to the highest temperature practicable. The diameter of the upper end of the mixing device being somewhat reduced forms within the upper end of the mixing-tube an enlarged chamber, from which the mixture of air and gas is delivered at the burner-tip. In addition to increasing the heating effect the ribs add also to the mixing action of the device. The enlarged chamber formed by the reduced portion of the mixing device also contributes to the mixing action of the device and, in that by this chamber the independent streams which are formed between the ribs are reunited in a more bulky current, the mixture is more uniformly distributed throughout the area of the burner-tip. If desired, the ribs 11 may be formed in a spiral direction upon the mixing device, as indicated in Fig. 5, in order to bring the fluids into more forcible contact therewith and to give them a whirling motion in the upper part of the mixing-tube, whereby they are still more perfectly mixed and more perfectly distributed to the burner-tip. The upper portion 2 of the mixing-tube may be provided with a flaring portion 12, so arranged as to substantially conform to the shape of the tapered portion of the mixing device, and the outer edges of the ribs 11 of the mixing device may, if desired, be brought into contact or nearly into contact with the inner walls of the flaring portion of the mixing-tube.

Any suitable form of burner-tip may be used. As shown, the tip 3 is provided with a plurality of radially-arranged passages 13, said passages being formed by slitting the metal and turning one of the edges of each slit downwardly and the other edge upwardly, as indicated in Figs. 2 and 3. In this way the flame and the heated products of combustion are given more or less of a whirling motion, whereby the mantle is more uniformly heated. As shown, moreover, the tip is constructed to slip down over the outer portion 1 of the mixing-tube, and the side walls of the tip are provided with one or more series of corrugations 14 for the purpose of holding the lower end of the mantle 15 out of intimate contact with the metal of the tip. This prevents the formation of the weak line which would otherwise be formed in the mantles where they come in contact with the top of the burners and also provides for the admission of a suitable amount of air to make the combustion of the fuel perfect. The mantle, as shown, is supported by a central rod 16 of suitable refractory material, which rests in an opening in the top of section 7 and is provided at its upper end with a fork 17, adapted to receive the cord 18 at the top of the mantle.

In accordance with a modified form of the burner-tip illustrated in Figs. 6 and 7 the top 19 of the burner is made flat and the elongated openings 20 are arranged in a more or less tangential direction instead of in a radial direction and the top 19 is formed of a separate piece of metal clamped in place on the outer portion 21 by means of a suitable flange.

As a special advantage of my construction it will be seen that by reason of the fact that the current of gas and air flowing through the mixing-tube is transformed into a thin elongated stream or streams, which stream or streams are confined between good heat-conducting surfaces, it is impossible for the flame to be propagated backwardly through the mixture to the nozzle 5.

My invention in its broader aspects is not limited to the particular construction shown nor to the particular construction by which it may be carried into effect, as many changes other than those herein suggested may be made in such construction without departing from the main principles of my invention or sacrificing its chief advantages.

What I claim as new, and desire to secure by Letters Patent, is—

1. In an incandescent gas-burner the combination with a mixing-tube having a flaring portion, of a mixing device consisting of an elongated tapering body having a number of longitudinal ribs extending in the same direction and forming between them unobstructed passages, said mixing device being centrally arranged within the flaring portion of said tube.

2. In an incandescent gas-burner the combination with a mixing-tube having a flaring portion, of means for injecting air and gas into one end of said tube, a burner-tip arranged at the opposite end of said tube, and a mixing device consisting of an elongated body, said body being tapered at one end and gradually reduced in section at the other end and arranged with its tapered portion within the flaring portion of said tube.

3. In an incandescent gas-burner the combination with a mixing-tube having a flaring portion, of means for injecting air and gas into said tube, and a mixing device consisting of an elongated body provided with a number of longitudinal ribs extending in the same direction and forming between them unobstructed passages, said mixing device being pointed at one end and arranged with its pointed end within the flaring portion of said tube.

4. In an incandescent gas-burner the combination with a mixing-tube having a flaring portion, of means for injecting the current of air and gas into one end of said tube, a burner-tip arranged at the opposite end of said tube, and a mixing device consisting of an elongated body having a tapered portion located within said flaring portion of the tube, said mixing device being reduced in section at one end and connected with the burner-tip at its reduced end.

5. In an incandescent gas-burner the combination with a mixing-tube having a flaring portion, of a means for injecting air and gas into said tube located at the smaller end thereof, a burner-tip located at the larger end of said tube, a mixing device consisting of an elongated body pointed at one end and provided with longitudinal ribs, said mixing device being supported by the burner-tip with its pointed end within the flaring portion of the mixing-tube.

6. In an incandescent gas-burner the combination with a mixing-tube having a flaring portion, of means for injecting a current of air and gas into one end of said tube, and a mixing device consisting of an elongated body having a ribbed tapered portion located within said flaring portion, said mixing device being reduced in section beyond the larger end of the tapered portion and connected to said burner-tip by the reduced portion, substantially as described.

7. In an incandescent gas-burner the combination with a mixing-tube, of means for injecting a current of air and gas into one end of said tube, a burner-tip arranged at the opposite end of said tube, and a mixing device consisting of an elongated body having a pointed end and a number of longitudinal ribs extending in the same direction and forming between them unobstructed passages, said mixing device being concentrically arranged within said mixing-tube, substantially as described.

8. In an incandescent gas-burner the combination with a mixing-tube, of means for injecting a current of air and gas into one end of said tube, a burner-tip arranged at the opposite end of said tube, and a mixing device consisting of an elongated body having longitudinal ribs, said mixing device being supported by said burner-tip within said mixing-tube.

9. In an incandescent gas-burner the combination with a mixing-tube, of means for injecting a current of air and gas into one end of said tube, a burner-tip arranged at the opposite end of said tube, and a mixing device consisting of an elongated ribbed body, said mixing device being supported by said burner-tip and located wholly within said mixing-tube.

In testimony whereof I have signed my name to this specification in the presence of two subscribing witnesses.

GEORGE W. THURNAU.

Witnesses:
EDWIN SEGER,
JOHN O. GEMPLER.